US008824501B2

(12) United States Patent
Liu et al.

(10) Patent No.: US 8,824,501 B2
(45) Date of Patent: Sep. 2, 2014

(54) PERFORMANCE ENHANCEMENT THROUGH OPTICAL VARIANTS

(75) Inventors: Xiang Liu, Marlboro, NJ (US); Peter J. Winzer, Aberdeen, NJ (US); Andrew Chraplyvy, Matawan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 207 days.

(21) Appl. No.: 13/245,160

(22) Filed: Sep. 26, 2011

(65) Prior Publication Data
US 2013/0070785 A1 Mar. 21, 2013

Related U.S. Application Data

(60) Provisional application No. 61/535,548, filed on Sep. 16, 2011.

(51) Int. Cl.
H04B 10/00 (2013.01)

(52) U.S. Cl.
CPC ...................................... *H04B 10/00* (2013.01)
USPC ......................................................... 370/464

(58) Field of Classification Search
None
See application file for complete search history.

(56) References Cited

U.S. PATENT DOCUMENTS

| | | | |
|---|---|---|---|
| 6,263,465 B1 | 7/2001 | Gehlot | |
| 6,683,855 B1 | 1/2004 | Bordogna et al. | |
| 7,212,741 B2 | 5/2007 | Myong et a | |
| 7,424,651 B2 | 9/2008 | Domagala et al. | |
| 7,574,146 B2 | 8/2009 | Chiang et al. | |
| 7,688,918 B2 | 3/2010 | Koc | |
| 7,734,191 B1 | 6/2010 | Welch et al. | |
| 2004/0114939 A1* | 6/2004 | Taylor | 398/152 |
| 2008/0075472 A1 | 3/2008 | Liu et al. | |
| 2008/0152361 A1 | 6/2008 | Chen et al. | |
| 2008/0279564 A1 | 11/2008 | Han et al. | |

(Continued)

FOREIGN PATENT DOCUMENTS

| | | |
|---|---|---|
| EP | 1 191 726 A1 | 3/2002 |
| EP | 1 341 322 A2 | 9/2003 |
| WO | 2010107439 A1 | 9/2010 |

OTHER PUBLICATIONS

International Search Report and Written Opinion; Mailed Nov. 23, 2012 for corresponding PCT Application No. PCT/US2012/054755.

(Continued)

*Primary Examiner* — Phuc Tran
*Assistant Examiner* — Kouroush Mohebbi
(74) *Attorney, Agent, or Firm* — Mendelsohn, Drucker & Dunleavy, P.C.; Yuri Gruzdkov; Steve Mendelsohn

(57) ABSTRACT

An optical transport system configured to transmit a set of two or more optical variants per bit-word, with the optical variants in the set being different from one another in one or more of the time of transmission, spatial localization, polarization of light, carrier wavelength, and subcarrier frequency. Differences between the optical variants may also be due to different respective constellation mapping. The optical variants of each set are detected and processed at the receiver in a manner that enables coherent summation of the corresponding electrical signals prior to constellation de-mapping. The coherent summation tends to average out the deleterious effects of linear and nonlinear noise/distortions imparted on the individual optical variants in the optical transport link because said noise/distortions are incoherent in nature. A BER reduction enabled by the use of optical variants may be implemented in addition to or instead of that provided by FEC coding.

20 Claims, 6 Drawing Sheets

(56) References Cited

U.S. PATENT DOCUMENTS

| | | | |
|---|---|---|---|
| 2009/0208224 A1* | 8/2009 | Kikuchi | 398/141 |
| 2010/0111531 A1* | 5/2010 | Tanimura et al. | 398/65 |
| 2010/0158521 A1 | 6/2010 | Doerr et al. | |
| 2010/0239267 A1* | 9/2010 | Kikuchi | 398/156 |
| 2010/0329670 A1 | 12/2010 | Essiambre et al. | |
| 2010/0329671 A1 | 12/2010 | Essiambre et al. | |
| 2011/0038631 A1 | 2/2011 | Doerr | |
| 2011/0150477 A1* | 6/2011 | Winzer | 398/65 |
| 2011/0305461 A1* | 12/2011 | Eiselt | 398/152 |
| 2012/0008952 A1* | 1/2012 | Li et al. | 398/65 |
| 2012/0141144 A1* | 6/2012 | Cai et al. | 398/202 |
| 2013/0070786 A1* | 3/2013 | Liu et al. | 370/464 |

OTHER PUBLICATIONS

Pan, Z. et al: "Intrabit Polarization Diversity Modulation for the Mitigation of PMD Effects", IEEE Photonics Technology Letters, IEEE Service Center, Piscataway, NJ, US, vol. 14, No. 10, Oct. 1, 2002, pp. 1466-1468.

Gupta, S., et al., "Dispersion Penalty Mitigation Using Polarization Mode Multiplexing in Phase Diverse Analog Optical Links"; Optical Fiber Communication/National Fiber Optic Engineers Conference; 2008; OFC/NFOEC 2008; Conference on, IEEE; Piscataway, NJ; Feb. 24, 2008; pp. 1-3; XP031391214.

Chongjin, X, et al., "Electronic Nonlinearity Compensation in 112-Gb/s PDM-QPSK Optical Coherent Transmission Systems"; 36th European Conference and Exhibition on Optical Communication (ECOC 2010); Torino, Italy, Sep. 19-23, 2010, IEEE, Piscataway, NJ; pp. 1-3; XP031789766.

Eado M., et al.; "Use of Space Time Coding in Coherent Polarization-Multiplexed Systems Suffering From Polarization-Dependent Loss"; Optics Letters, OSA, Optical Society of America, Washington, DC, vol. 35, No. 21; Nov. 2, 2010; pp. 3547-3549; XP001558183.

International Search Report; Mailed Dec. 5, 2012 for corresponding PCT Application No. PCT/US2012/055012.

International Search Report; Mailed Nov. 23, 2012 for corresponding PCT Application No. PCT/US2012/054813.

\* cited by examiner

PERFORMANCE ENHANCEMENT THROUGH OPTICAL VARIANTS

CROSS-REFERENCE TO RELATED APPLICATIONS

This application claims priority from U.S. Provisional Patent Application No. 61/535,548, filed on Sep. 16, 2011, and entitled "PERFORMANCE ENHANCEMENT THROUGH OPTICAL VARIANTS," which is incorporated herein by reference in its entirety.

BACKGROUND

1. Field

The invention(s) relate to optical communication equipment and, more specifically but not exclusively, to equipment for managing data transport through a noisy optical channel.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Forward error correction (FEC) uses systematically generated redundant data to reduce the bit-error rate (BER) at the receiver. The cost of this reduction is a concomitant increase in the required forward-channel bandwidth, with the latter being dependent on the data rate of the FEC code. In general, an FEC code with a lower payload data rate is used for a noisier channel. When the channel conditions fluctuate over time, the data rate and/or the FEC code can be adaptively changed to maintain an acceptable BER. However, one problem with FEC coding, as applied to optical transport systems, is that the coding-gain differences among various implementable FEC codes usually do not exceed a certain maximum value, as given by Shannon's information theory. Therefore, for certain optical channels, additional and/or alternative performance-enhancement techniques may be needed to overcome these and other pertinent limitations of FEC coding.

SUMMARY

Problems in the prior art are addressed by various embodiments of an optical transport system configured to transmit a set of two or more optical variants per bit-word, with the optical variants in the set being different from one another in one or more of the time of transmission, spatial localization, polarization of light, carrier wavelength, and subcarrier frequency in orthogonal frequency-division multiplexed (OFDM) systems. The optical variants of each set are detected and processed at the receiver in a manner that enables coherent (or constructive) summation of the corresponding electrical signals prior to constellation de-mapping. The coherent summation tends to average out the deleterious effects of both linear and nonlinear noise/distortions imparted on the individual optical variants in the optical transport link because said noise/distortions are incoherent in nature. In various embodiments, a BER reduction enabled by the use of optical variants can be implemented in addition to or instead of that provided by FEC coding.

According to one embodiment, provided is an optical receiver comprising a front-end circuit configured to convert an optical input signal into a corresponding plurality of digital electrical signals; and a processor configured to process the plurality of digital electrical signals to generate a first set of values corresponding to a first bit-word; to sum the values of the first set to generate a summed value; and to map the summed value onto a constellation to determine the first bit-word. In response to the optical input signal having at least a first optical variant and a second optical variant, each carrying the first bit-word, the processor is configured to include into the first set at least one value that corresponds to the first optical variant and at least one value that corresponds to the second optical variant.

According to another embodiment, provided is an optical transmitter configured to generate an optical output signal in response to an input data stream in a manner that causes the optical output signal to have at least a first optical variant and a second optical variant, both corresponding to a first bit-word, wherein the first and second optical variants differ from one another in at least one of carrier wavelength, spatial localization, and constellation mapping.

If the first and second optical variants differ from one another in spatial localization, then the optical transmitter may have an optical coupler configured to apply the first optical variant to a first core of a multi-core fiber; and to apply the second optical variant to a second core of the multi-core fiber.

If the first and second optical variants differ from one another in constellation mapping, then the optical transmitter may have a processor configured to subject an input data stream to FEC coding to generate an FEC-coded data stream; and to convert the FEC-coded data stream into two or more parallel sequences of constellation symbols. For each bit-word of the FEC-coded data stream, said two or more parallel sequences of constellation symbols have at least two different constellation symbols, each corresponding to a different respective constellation-mapping procedure. The optical transmitter is further configured to generate different optical variants corresponding to a bit-word based on the respective at least two different constellation symbols produced by different respective constellation-mapping procedures.

According to yet another embodiment, provided is an optical receiver comprising a front-end circuit configured to receive an optical input signal from a multi-core fiber or a multimode fiber; to combine at least two different spatial components corresponding to a first bit-word carried by the optical input signal to generate a combined optical signal, said two different spatial components representing respective optical signals received from respective different cores of the multi-core fiber or respective different modes of the multimode fiber; and to generate a plurality of digital electrical signals based on the combined optical signal. The optical receiver further comprises a processor configured to apply an inverse transfer function corresponding to said multi-core fiber or said multimode fiber to the plurality of digital electrical signals to generate a complex value corresponding to the at least two different spatial components; and to map the complex value onto a constellation to determine the first bit-word. In one implementation, the processor includes a finite impulse response (FIR) filter circuit configured to apply said inverse transfer function to said plurality of digital electrical signals.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
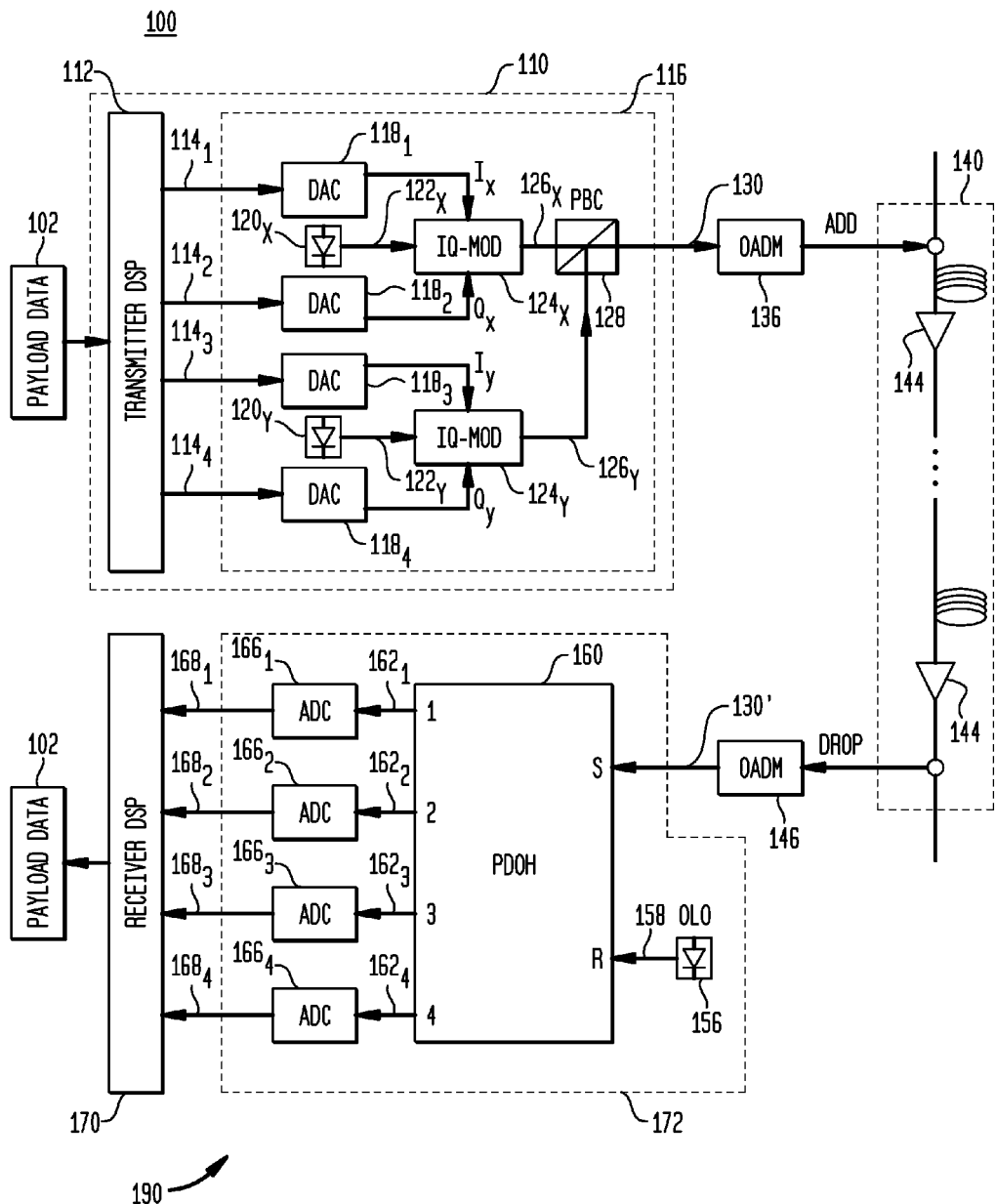
FIG. 1 shows a block diagram of an optical transport system according to one embodiment of the invention.

An optical transport link is typically configured to support multiple degrees of freedom, such as time, space, carrier frequency (wavelength), and polarization. Each of these degrees of freedom can be used for optical-signal multiplexing. Multiplexing techniques corresponding to these four different individual degrees of freedom are referred to in the literature as time-division multiplexing, space-division multiplexing, wavelength-division multiplexing, orthogonal frequency-division multiplexing, and polarization-division multiplexing.

In addition to or instead of using the various degrees of freedom supported by an optical transport link for multiplexed transmission of independent optical signals, various embodiments of the invention employ these degrees of freedom for the transmission of correlated optical signals, referred to as optical variants. In a representative embodiment, two optical variants are two optical signals that carry the same piece of data, bit-word, or bit sequence, but differ from each other in at least one of their degrees of freedom, e.g., in one or more of the time of transmission, spatial localization, polarization of light, carrier wavelength, and subcarrier frequency.

For example, a first transmission of an optical symbol at time t1 and a second transmission of that same optical symbol at time t2>t1 represent two different optical variants of the bit-word that the optical symbol encodes. As another example, a first transmission of an optical symbol using carrier wavelength $\lambda_1$ and a second (e.g., concurrent) transmission of that optical symbol using carrier wavelength $\lambda_2$ similarly represent two different optical variants of the bit-word that the optical symbol encodes. As yet another example, a first transmission of an optical symbol via a first propagation path of a multipath fiber or fiber-optic cable (e.g., via a first core of a multi-core fiber or a first guided mode of a multimode fiber) and a second transmission of that optical symbol via a second propagation path of that multipath fiber or fiber-optic cable (e.g., via a second core of the multi-core fiber or a second guided mode of the multimode fiber) represent two different optical variants of the bit-word that the optical symbol encodes. As yet another example, a first transmission of an optical symbol using a first (e.g., X) polarization and a second transmission of that optical symbol using a second (e.g., Y) polarization represent two different optical variants of the bit-word that the optical symbol encodes.

Note that, in each of these examples, the two corresponding optical variants are described as differing from one another in the parameters of just one degree of freedom. However, optical variants may differ from one another in the parameters of two or more degrees of freedom, such as: (i) time and space; (ii) time and wavelength; (iii) time and polarization; (iv) space and wavelength; (v) space and polarization; (vi) wavelength and polarization; (vii) time, space, and wavelength; (viii) time, space, and polarization; (ix) time, wavelength, and polarization; (x) space, wavelength, and polarization; or (xi) time, space, wavelength, and polarization.

The concept of optical variants also applies to (i) optical symbol sequences that carry multiple bit-words and (ii) optical signals that carry the same bit-word using different optical symbols. Other pertinent features of "optical variants" will become more fully apparent, by way of example, from the following more detailed description that is given below in reference to FIGS. 1-6.

Various embodiments rely on an inventive concept, according to which the receiver adds, in a phase-coherent manner, the electrical signals corresponding to multiple (e.g., M>1) copies or variants of the same symbol stream prior to demodulation and de-coding. Each of these M variants, possibly including scrambled and/or deterministically transformed copies of the symbols, is conveyed from the transmitter to the receiver on orthogonal transmission paths or dimensions, where each variant is altered by different realizations of signal impairments, such as noise and/or signal distortions, from linear and/or nonlinear effects.

FIG. 1 shows a block diagram of an optical transport system 100 according to one embodiment of the invention. System 100 has an optical transmitter 110 that is configured to transmit optical variants that differ from each other in time or polarization, or both. System 100 also has an optical receiver 190 that is configured to process the received optical variants to recover the corresponding original data in a manner that reduces the BER compared to the BER attainable without the use of optical variants. Transmitter 110 and receiver 190 are connected to one another via an optical transport link 140.

Transmitter 110 receives an input stream 102 of payload data and applies it to a digital signal processor (DSP) 112. Processor 112 processes input stream 102, e.g., as further described below in reference to FIG. 2, to generate digital signals 114$_1$-114$_4$. In each signaling interval (time slot), signals 114$_1$ and 114$_2$ carry digital values that represent the in-phase (I) component and quadrature-phase (Q) component, respectively, of a corresponding constellation symbol intended for transmission using X-polarized light. Signals 114$_3$ and 114$_3$ similarly carry digital values that represent the I and Q components, respectively, of the corresponding constellation symbol intended for transmission using Y-polarized light.

An electrical-to-optical (E/O) converter (also sometimes referred to as a front end) 116 of transmitter 110 transforms digital signals 114$_1$-114$_4$ into a modulated optical output signal 130. More specifically, digital-to-analog converters (DACs) 118$_1$ and 118$_2$ transform digital signals 114$_1$ and 114$_2$ into an analog form to generate drive signals $I_X$ and $Q_X$, respectively. Drive signals $I_X$ and $Q_X$ are then used, in a conventional manner, to drive an I-Q modulator 124$_X$. Based on drive signals $I_X$ and $Q_X$, I-Q modulator 124$_X$ modulates an X-polarized beam 122$_X$ of light supplied by a laser source 120$_X$, thereby generating a modulated optical signal 126$_X$.

DACs 118$_3$ and 118$_4$ similarly transform digital signals 114$_3$ and 114$_4$ into an analog form to generate drive signals $I_Y$ and $Q_Y$, respectively. Based on drive signals $I_Y$ and $Q_Y$, an I-Q modulator 124$_Y$ modulates a Y-polarized beam 122$_Y$ of light supplied by a laser source 120$_Y$, thereby generating a modulated optical signal 126$_Y$. A polarization beam combiner 128 combines modulated optical signals 126$_X$ and 126$_Y$ to generate optical output signal 130.

In a representative configuration, processor 112 generates digital signals $114_1$-$114_4$ so that, for each bit-word to be transmitted to receiver 190, optical output signal 130 contains a set of M optical variants carrying that bit-word, where M is a an integer greater than one. Conceptually, this set can be viewed as comprising one or more overlapping and/or non-overlapping subsets. For example, there might be a subset consisting of two or more optical variants, in which the optical variants have the same polarization, but different temporal positions in signal 130. Alternatively or in addition, there might be another subset consisting of two optical variants, in which the optical variants have the same temporal position (the same time slot) in signal 130, but different polarizations. Furthermore, there might be yet another subset consisting of two optical variants, in which the optical variants have different temporal positions in signal 130 and different polarizations.

Figure 2:
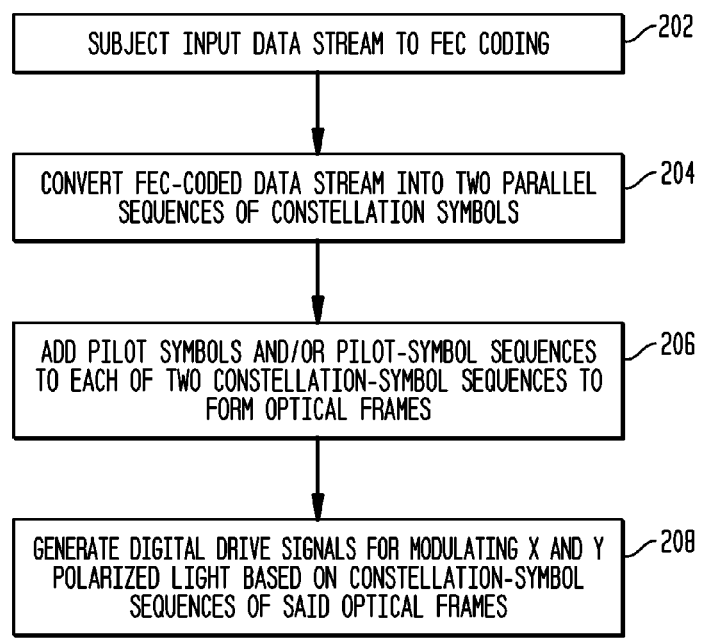
FIG. 2 shows a flowchart of a signal-processing method that can be implemented in the transmitter of the optical transport system shown in FIG. 1 according to one embodiment of the invention.

FIG. 2 shows a flowchart of a signal-processing method 200 that can be employed by processor 112 (FIG. 1) to transform input data stream 102 into digital signals $114_1$-$114_4$ according to one embodiment of the invention.

At step 202 of method 200, input data stream 102 is subjected to FEC coding, as known in the art, using an appropriate FEC code and data rate. As a result, input data stream 102 is transformed into a corresponding FEC-coded data stream.

At step 204, the FEC-coded data stream generated at step 202 is converted into two parallel sequences of constellation symbols. This conversion can be accomplished, e.g., by performing the following sub-steps: (a) selecting a portion of the FEC-coded data stream; (b) partitioning the selected portion into bit-words; (c) converting each bit-word into a corresponding set P having M constellation symbols; (d) interspersing the constellation symbols of the different sets P in a prescribed manner to generate two parallel constellation-symbol sequences $S_X$ and $S_Y$; and (e) repeating steps (a)-(d) for a next portion of the FEC-coded data stream.

Regarding sub-steps (a) and (b), the length of the selected portion depends on a desired size of an optical frame and is usually an integer multiple of the bit-word length. The bit-word length depends on the constellation used by transmitter 110. For example, if a QPSK (quadrature phase-shift keying) constellation is used, then each bit-word has a length of two bits. If an 8-QAM (quadrature amplitude modulation) constellation is used, then each bit-word has a length of three bits, etc.

Regarding sub-step (c), in one embodiment, all M constellation symbols of set P are the same and generated by direct mapping of the bit-word onto the operative constellation. In another embodiment, the M constellation symbols of set P may contain two or more different constellation symbols obtained through different variants of constellation mapping. These different variants of constellation mapping can be determined using a known transform. One representative example of such a transform is phase rotation.

As an example of the latter embodiment, let us consider a QPSK constellation, which has four constellation symbols (often represented by points on a complex plane), each encoding a two-bit bit-word. Then, the requisite M constellation symbols that are not all identical can be generated as follows.

First, a sequence $B_1$ having 2M bits is formed by concatenating M copies of the bit-word.

Second, a specified transformation is applied to sequence $B_1$ to generate another sequence $B_2$, which also has 2M bits. In a representative embodiment, the transformation can be performed according to Eq. (1):

$$B_2 = B_1 \text{ XOR } C \quad (1)$$

where C is a predetermined bit sequence having 2M bits. In a representative implementation, sequence C is a pseudo-random bit sequence. In other embodiments, other suitable logic functions and/or bit sequences can similarly be used.

Third, sequence $B_2$ is partitioned into M bit-words, each having two bits.

Finally, each of these M bit-words is converted into a corresponding constellation symbol by direct mapping of the bit-word onto the QPSK constellation. These M constellation symbols are then used to form set P corresponding to the original bit-word.

Note that, in the QPSK constellation, all constellation symbols have the same amplitude, but different phases. In view of this property, the above-described exemplary processing can conceptually be viewed as a phase-scrambling operation, wherein sequence C (see Eq. (1)) serves as a phase-scrambling key. Provided that sequence C is known to receiver 190, the phase of the received signal in each time slot can be unscrambled in a relatively straightforward manner to approximate the signal that would have been received in the time slot without the phase-scrambling.

As another example, let us consider a generic $2^K$-QAM constellation, which has $2^K$ constellation symbols (points), each encoding a K-bit bit-word, where K is an integer greater than one. Then, the requisite set P having M constellation symbols that are not all identical can be generated using the following two steps.

First, the bit-word is converted into a "kernel" constellation symbol $A_0$, e.g., by direct mapping of the bit-word onto the operative constellation.

Second, constellation symbol $A_0$ is transformed into set P of M constellation symbols according to Eq. (2):

$$P = (T_1 A_0, T_2 A_0, \ldots T_M A_0) \quad (2)$$

where each $T_j$ (j=1, 2, ... M) is a transform selected in a prescribed manner from a group, G, of linear topological transforms T. More specifically, as an algebraic structure, group G has the following property: when any element T of group G operates on a symbol of the operative constellation, the result is a symbol of that same constellation. This resulting symbol can be (i) the same as the initial symbol, i.e., the corresponding transform T is a unity transform, or (ii) different from the initial symbol, i.e., the corresponding transform T is a non-unity transform. A useful representation of group G for a complex-plane representation of the operative constellation is a set of discrete complex values, with the transform operation being implemented as a multiplication of the complex value representing the constellation point and the discrete complex value representing transform T. Some of the discrete complex values may have an absolute value of one and, as such, represent a pure rotation of the constellation points in the complex plane. Some other of the discrete complex values may be real and, as such, represent an amplitude-scaling operation, not accompanied by a rotation. Yet some other of the discrete complex values may have a non-zero imaginary part and an absolute value that is different from one and, as such, represent a combination of an amplitude compression or expansion accompanied by a rotation in the complex plane. One skilled in the art will understand that the content of group G depends on the topology of the operative constellation.

Regarding sub-step (d), in one embodiment, constellation-symbol sequences $S_X$ and $S_Y$ can be generated according to Eqs. (3a)-(3b):

$$S_X = (p_{11}, p_{31}, \ldots, p_{(N-1)1}, p_{12}, p_{32}, \ldots, p_{(N-1)2}, \ldots \\ p_{1M}, p_{3M}, \ldots p_{(N-1)M}) \quad (3a)$$

$$S_Y = (p_{21}, p_{41}, \ldots, p_{N1}, p_{22}, p_{42}, \ldots, p_{N2}, \ldots, p_{2M}, \\ p_{4M}, \ldots, p_{NM}) \quad (3b)$$

where N is the number of bit-words in the portion selected at sub-step (a); and $P_j = (p_{j1}, p_{j2}, \ldots, p_{jM})$ is the set P corresponding to the j-th bit-word, where j=1, 2, ..., N. Note that, for illustration purposes and without limitation, Eqs. (3a)-(3b) assume an even N.

Inspection of Eqs. (3a)-(3b) reveals that constellation-symbol sequences $S_X$ and $S_Y$ defined by these equations are generated by (1) taking the first constellation symbol of each set $P_j$ (j=1, 2, ..., N) and placing these constellation symbols, one by one, in an alternating manner, into sequences $S_X$ and $S_Y$; (2) taking the second constellation symbol of each set $P_j$ and placing these constellation symbols, one by one, in an analogous alternating manner, into sequences $S_X$ and $S_Y$; and so on until all M constellation symbols of each set $P_j$ are placed into sequences $S_X$ and $S_Y$. In alternative embodiments, other suitable symbol-interspersing schemes may similarly be used. It has been determined that symbol-interspersing schemes in which two constellation symbols corresponding to the same bit-word are separated from one another by one or more constellation symbols corresponding to one or more other bit-words may have certain advantages.

In one embodiment, the applied transforms can vary from bit-word to bit-word. As an example, $T_j$ may be time-dependent and selected in a prescribed manner as indicated in the following table:

| t = t1 | t = t2 | t = t3 | t = t4 |
|--------|--------|--------|--------|
| $T_1 = 1$ | $T_1 = 1$ | $T_1 = 1$ | $T_1 = 1$ |
| $T_2 = 1$ | $T_2 = i$ | $T_2 = -1$ | $T_2 = -i$ |
| $T_3 = 1$ | $T_3 = -1$ | $T_3 = 1$ | $T_3 = -1$ |

Note that, in the table, i denotes the imaginary unit.

At step 206, pilot symbols and/or pilot-symbol sequences may be added to each of sequences $S_X$ and $S_Y$. One purpose of the added pilot symbols and/or pilot-symbol sequences is to form an optical frame having a well-defined structure. This structure can be used at receiver 190 to distinguish the optical symbols corresponding to the payload data from the pilot symbols/sequences. The pilot symbols/sequences can then be used to perform one or more of (i) time synchronization, (ii) frequency estimation and compensation, and (iii) channel estimation and compensation. An enabling description of possible frame structures and suitable pilot symbols/sequences can be found, e.g., in commonly owned U.S. patent application Ser. No. 12/964,929 (filed on Dec. 10, 2010), which is incorporated herein by reference in its entirety.

At step 208, the two constellation-symbol sequences of the optical frame generated at step 206 are used to generate digital signals 114₁-114₄ (FIG. 1). More specifically, the constellation-symbol sequence having sequence $S_X$ and the pilot symbols added to it at step 206 is used to generate digital signals 114₁-114₂. The constellation-symbol sequence having sequence $S_Y$ and the pilot symbols added to it at step 206 is similarly used to generate digital signals 114₃-114₄. Appropriate oversampling and/or pulse-shaping techniques may be employed during step 208, as known in the art.

Referring back to FIG. 1, system 100 has an optical add-drop multiplexer (OADM) configured to add signal 130, as known in the art, to other optical signals that are being transported via optical transport link 140. Link 140 is illustratively shown as being an amplified link having a plurality of optical amplifiers 144 configured to amplify the optical signals that are being transported through the link, e.g., to counteract signal attenuation. Note that an optical link that does not have optical amplifiers can alternatively be used as well. After propagating the intended length of link 140, signal 130 is dropped from the link via another optical add-drop multiplexer, OADM 146, and directed to receiver 190 for processing. Note that the optical signal applied to receiver 190 by OADM 146 is labeled 130', which signifies the fact that, while in transit between transmitter 110 and receiver 190, signal 130 may accumulate noise and other signal distortions due to various linear effects and nonlinear effects in the optical fiber. One type of a fiber nonlinear effect is intra-channel four-wave mixing (IFWM), which is a function of the phases and amplitudes of the corresponding optical symbols.

Receiver 190 has a front-end circuit 172 comprising an optical-to-electrical (O/E) converter 160, four analog-to-digital converters (ADCs) 166₁-166₄, and an optical local oscillator (OLO) 156. O/E converter 160 has (i) two input ports labeled S and R and (ii) four output ports labeled 1 through 4. Input port S receives optical signal 130'. Input port R receives an optical reference signal 158 generated by optical local oscillator 156. Reference signal 158 has substantially the same optical-carrier frequency (wavelength) as signal 130'. Reference signal 158 can be generated, e.g., using a tunable laser controlled by a wavelength-control loop (not explicitly shown in FIG. 1) that forces an output wavelength of the tunable laser to closely track the carrier wavelength of signal 130'.

O/E converter 160 operates to mix input signal 130' and reference signal 158 to generate eight mixed optical signals (not explicitly shown in FIG. 1). O/E converter 160 then converts the eight mixed optical signals into four electrical signals 162₁-162₄ that are indicative of complex values corresponding to the two orthogonal-polarization components of signal 130'. For example, electrical signals 162₁ and 162₂ may be an analog in-phase signal and an analog quadrature-phase signal, respectively, corresponding to the X-polarization component of signal 130'. Electrical signals 162₃ and 162₄ may similarly be an analog in-phase signal and an analog quadrature-phase signal, respectively, corresponding to the Y-polarization component of signal 130'.

In one embodiment, O/E converter 160 is a polarization-diverse 90-degree optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

Each of electrical signals 162₁-162₄ generated by O/E converter 160 is converted into digital form in a corresponding one of ADCs 166₁-166₄. Optionally, each of electrical signals 162₁-162₄ may be amplified in a corresponding amplifier (not explicitly shown) prior to the resulting signal being converted into digital form. Digital signals 168₁-168₄ produced by ADCs 166₁-166₄ are processed by a digital signal processor (DSP) 170, e.g., as further described below in reference to FIG. 3, to recover the data of the original input stream 102 applied to transmitter 110.

Figure 3:
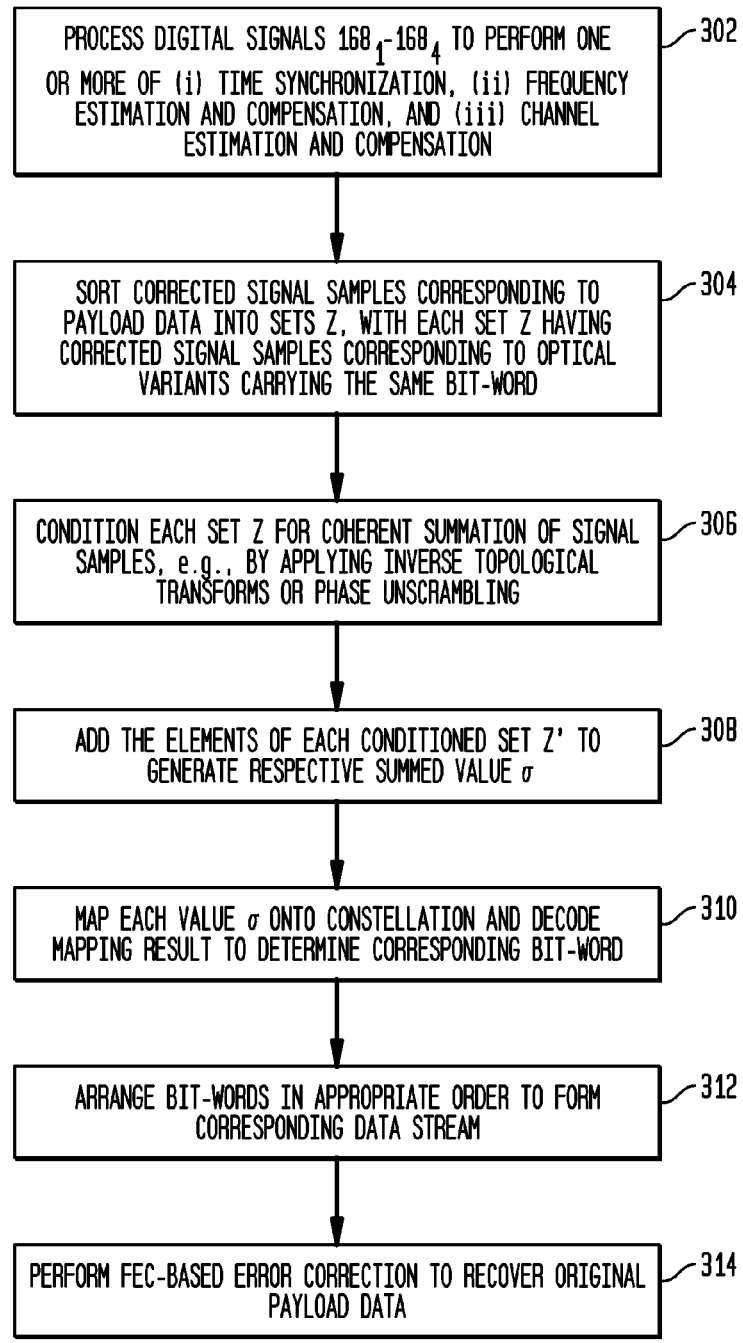
FIG. 3 shows a flowchart of a signal-processing method that can be implemented in the receiver of the optical transport system shown in FIG. 1 according to one embodiment of the invention.

FIG. 3 shows a flowchart of a signal-processing method 300 that can be employed by processor 170 (FIG. 1) to recover data stream 102 from digital signals 168₁-168₄ according to one embodiment of the invention.

At step 302 of method 300, digital signals 168₁-168₄ are processed to perform one or more of (i) time synchronization, (ii) frequency estimation and compensation, and (iii) channel estimation and compensation, e.g., as described in the above-cited U.S. patent application Ser. No. 12/964,929.

In a representative implementation, the time-synchronization procedure of step 302 relies on certain properties of pilot-symbol sequences to determine the start of each optical frame. The known structure of the optical frame can then be used to identify time slots that have digital samples and/or digital-signal portions corresponding to the optical symbols carrying the payload data.

The frequency-estimation/compensation procedure of step 302 performs electronic estimation and compensation of a mismatch between the carrier-frequency of input signal 130' and the frequency of reference signal 158 (see FIG. 1). After the frequency offset is determined, frequency-mismatch can be compensated, e.g., by applying to each digital sample a phase shift equal to the frequency offset multiplied by $2\pi$ and the time elapsed between the start of the frame and the temporal position of the digital sample.

The channel-estimation/compensation procedure of step 302 performs electronic estimation and compensation of the phase and amplitude distortions imposed by optical transport link 140. The channel estimation relies on digital samples corresponding to pilot symbols to determine the channel-response function, H, of optical transport link 140. The inverse channel-response function $H^{-1}$ is then applied to the digital samples corresponding to payload data to perform channel compensation.

At step 304, the corrected signal samples corresponding to the payload data are sorted into sets Z, with each set Z having corrected signal samples corresponding to the optical variants carrying the same bit-word. For example, let us assume, for illustration purposes and without limitation, that the digitization speed of ADCs 166 is such that each of digital signals 168$_1$-168$_4$ has a single signal sample per time slot. Then, each set Z of corrected signal samples consists of M complex values $z_m$ (where m=1, 2, . . . , M), as expressed by Eq. (4):

$$Z=(z_1, z_2, \ldots, z_M) \quad (4)$$

Depending on the polarization of the corresponding optical variant, the real and imaginary parts of each complex value $z_m$ may correspond to (i) the signal samples provided by digital signals 168$_1$ and 168$_2$, respectively, or (ii) the signal samples provided by digital signals 168$_3$ and 168$_4$, respectively.

At step 306, each set Z of corrected signal samples generated at step 304 is conditioned for coherent summation. In one embodiment, the processor is configured to perform a phase-estimation and phase compensation operation for each element of set Z in the conditioning process. Known pilot symbols or pilots can be used to assist the phase-estimation and phase-compensation operations. In another embodiment, processor 170 is configured to obtain the phase difference between different elements of set Z. The absolute phases of the received samples may not be needed if differential encoding/de-coding is employed in the system.

Step 306 includes additional operations if set P of the original constellation symbols corresponding to set Z has different constellation symbols. For example, if Eq. (2) was used to generate set P at transmitter 110, then the conditioning processing of step 306 may be performed based on Eq. (5):

$$Z'=(T_1^{-1}z_1, T_2^{-1}z_2, \ldots, T_M^{-1}z_M) \quad (5)$$

where Z' is the conditioned set; and $T_m^{-1}$ is the inverse of transform $T_m$ (also see Eq. (2)). For the complex-value representation of transform $T_m$, inverse transform $T_m^{-1}$ is a complex value that satisfies the condition of $T_m^{-1}T_m=1$.

Inspection of Eq. (5) reveals that each element $z_m'=T_m^{-1}z_m$ of conditioned set Z' is obtained by applying an inverse of transform $T_m$, with the latter being the transform that was used at transmitter 110 for the generation of the corresponding optical variant. Note that, similar to set Z (see Eq. (4)), conditioned set Z' has M complex values (i.e., values $z_m'$, where m=1, 2, . . . , M). In the absence of noise and distortions imposed by link 140, all values $z_m'$ would have been the same, with their common value being the complex value representing constellation point $A_0$ (see Eq. (2)). However, the noise and distortions imposed by link 140 cause values $z_m'$ to differ from one another. When plotted on a complex plane as points, values $z_m'$ typically form a scatter pattern around the complex value representing constellation point $A_0$, with the magnitude of the scatter being dependent on the level of noise and the severity of distortions imposed by link 140.

At step 308, for each conditioned set Z', the constituent values $z_m'$ are summed up to generate a summed value, $\sigma$. The summation serves to (i) coherently add the components of values $z_m'$ that represent the original constellation point, e.g., constellation point $A_0$ (Eq. (2)), and (ii) reduce the relative magnitude of noise/distortions in $\sigma$ compared to that in individual values $z_m'$. The reduction occurs because the noise/distortions are incoherent and, as such, tend to average out upon summation.

At step 310, each summed value $\sigma$ is mapped onto the operative constellation, in a conventional manner, and decoded to determine the corresponding bit-word. Step 310 may optionally include a sub-step of phase estimation and compensation that corrects or compensates for slowly changing phase shifts between input signal 130' and reference signal 158 (FIG. 1) and is performed prior to the constellation de-mapping and decoding. Various methods that can be used for this purpose are disclosed, e.g., in U.S. Patent Application Publication Nos. 2008/0152361 and 2008/0075472 and U.S. Pat. No. 7,688,918, all of which are incorporated herein by reference in their entirety.

At step 312, the bit-words generated at step 310 are arranged in the appropriate order to form the corresponding data stream. The order in which the various bit-words are placed in the data stream corresponds to the order that was used at steps 204(a)-204(b) to partition the original FEC-coded stream into bit-words (see the description of step 204, FIG. 2).

At step 314, the data stream generated at step 312 is processed to perform error correction using data redundancies that were introduced at step 202 (FIG. 2). The resulting error-corrected data stream has the payload data of data stream 102. Many FEC methods suitable for implementing step 314 are known in the art. Several representative examples of such methods are disclosed, e.g., in U.S. Pat. Nos. 7,734,191, 7,574,146, 7,424,651, 7,212,741, and 6,683,855, all of which are incorporated herein by reference in their entirety.

Figure 4:
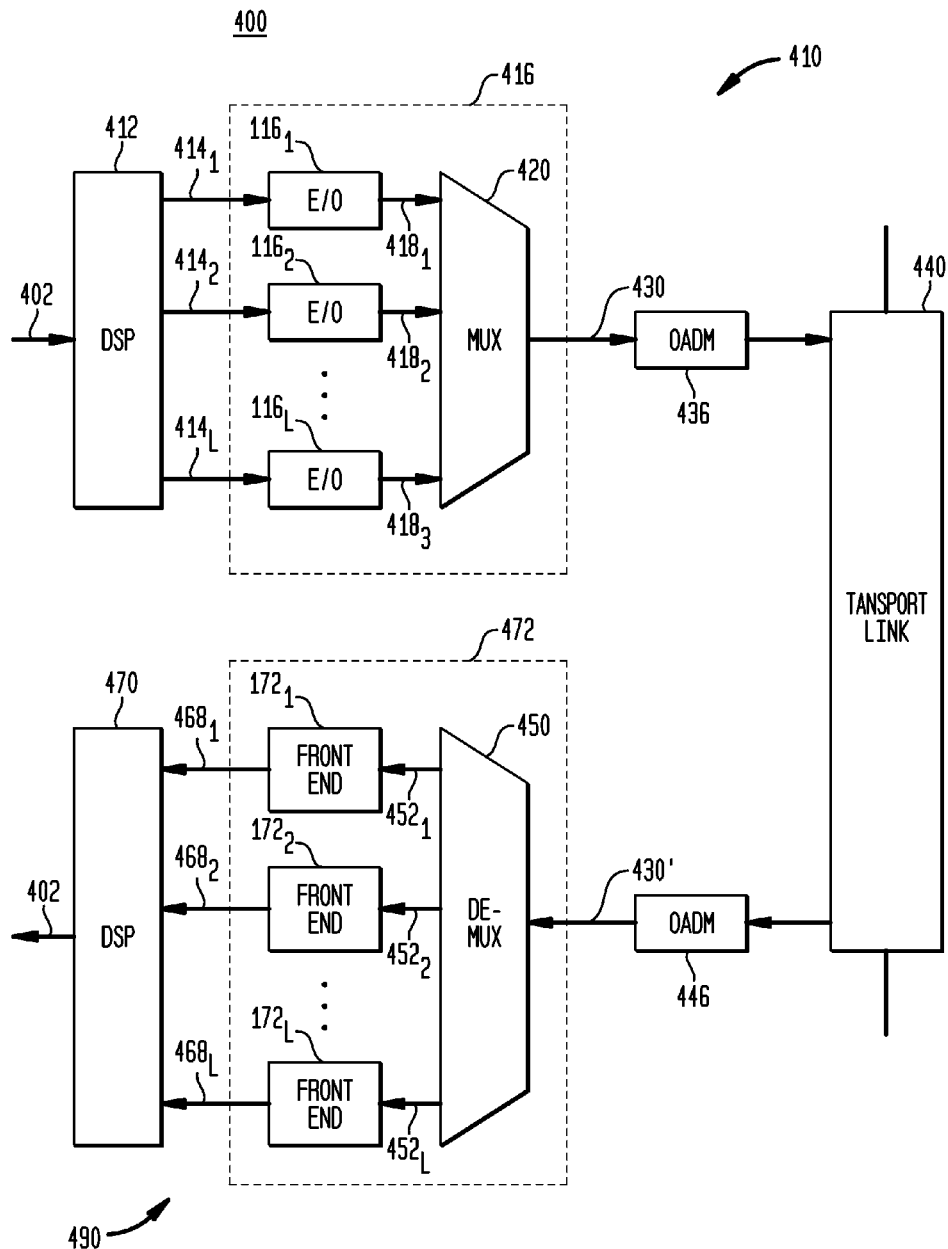
FIG. 4 shows a block diagram of an optical transport system according to another embodiment of the invention.

FIG. 4 shows a block diagram of an optical transport system 400 according to another embodiment of the invention. System 400 has an optical transmitter 410 that is configured to transmit optical variants that differ from each other in one or more of time, space, polarization, carrier wavelength, and subcarrier frequency in orthogonal frequency-division multiplexed (OFDM) systems. System 400 also has an optical receiver 490 that is configured to process the received optical variants to recover the corresponding original data in a manner that reduces the BER compared to the BER attainable without the use of optical variants. Transmitter 410 and receiver 490 are connected to one another via an optical transport link 440.

Transmitter 410 has a front-end circuit 416 having L electrical-to-optical (E/O) converters 116$_1$-116$_L$ (also see FIG. 1), each configured to use a different respective carrier wavelength selected from a specified set of wavelengths $\lambda_1$-$\lambda_L$. Transmitter 410 further has a wavelength multiplexer (MUX)

420 configured to combine optical output signals $418_1$-$418_L$ generated by E/O converters $116_1$-$116_L$, respectively, and apply a resulting WDM signal 430 to an OADM 436 for adding it to the signals that are being transported through link 440.

Each of E/O converters $116_1$-$116_L$ generates its respective optical output signal 418 based on a corresponding set 414 of digital signals supplied by a DSP 412. Each signal set 414 has four digital signals that are analogous to digital signals $114_1$-$114_4$ (FIG. 1). Signal sets $414_1$-$414_L$ are generated by DSP 412 based on an input data stream 402. In one embodiment, the corresponding processing implemented in DSP 412 is generally analogous to method 200 (FIG. 2). However, one modification to that method is that the number of parallel sequences of constellation symbols is now 2L. Accordingly, sub-step 204(d) is carried out to distribute the various constellation symbols corresponding to the same bit-word over more than two sequences, e.g., over up to L sequences $S_X$ and up to L sequences $S_Y$ corresponding to different E/O converters 116 (also see Eq. (3)). Steps 206 and 208 are also appropriately modified to accommodate this change.

After propagating through link 440, signal 430 is dropped from the link (as signal 430') via another optical add-drop multiplexer, OADM 446, and directed to receiver 490 for processing. Receiver 490 has a front-end circuit 472 comprising a wavelength de-multiplexer (DEMUX) 450 and L front-end circuits $172_1$-$172_L$ (also see FIG. 1). Wavelength de-multiplexer (DEMUX) 450 is configured to de-multiplex signal 430' into its constituent WDM components $452_1$-$452_L$, each having a corresponding one of carrier wavelengths $\lambda_1$-$\lambda_L$. Each of front-end circuits $172_1$-$172_L$ then processes the corresponding one of signals $452_1$-$452_L$, as described above in reference to FIG. 1, to generate a corresponding one of sets $468_1$-$468_L$ of digital signals, with each set consisting of four digital signals analogous to digital signals $168_1$-$168_4$, respectively (see FIG. 1).

Signal sets $468_1$-$468_L$ generated by front-end circuit 472 are processed by a DSP 470 to recover the data of original input stream 402 applied to transmitter 410. In one embodiment, the processing implemented in DSP 470 is generally analogous to method 300 (FIG. 2). However, one modification to that method is that the corrected signal samples for forming each set Z (see step 304 in FIG. 3) are now collected from a larger number of digital signals provided by sets $468_1$-$468_L$. Steps 306 and 312 are also appropriately modified to accommodate this change and reflect the above-described change to method 200 implemented at transmitter 410.

Figure 5:
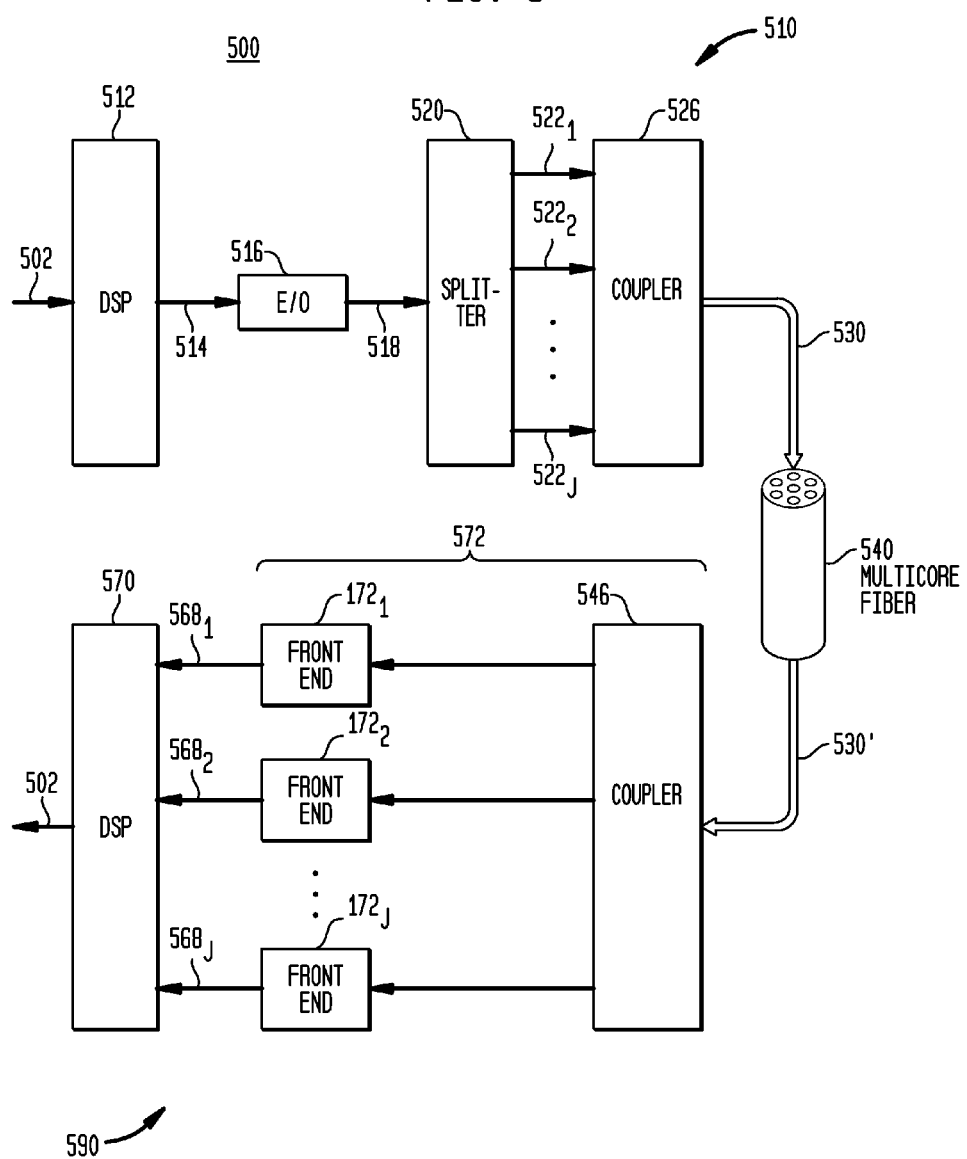
FIG. 5 shows a block diagram of an optical transport system according to yet another embodiment of the invention.

FIG. 5 shows a block diagram of an optical transport system 500 according to yet another embodiment of the invention. System 500 has an optical transmitter 510 that can be configured to transmit optical variants that differ from each other in one or more of time, polarization, and space (as represented by a plurality of different propagation paths). System 500 also has an optical receiver 590 that is configured to process the received optical variants to recover the corresponding original data in a manner that reduces the BER compared to the BER attainable without the use of optical variants. Transmitter 510 and receiver 590 are connected to one another via an optical transport link comprising a multi-core fiber 540, different cores of which provide the plurality of propagation paths.

Transmitter 510 has an electrical-to-optical (E/O) converter 516 that is analogous to E/O converter 116 (FIG. 1). Transmitter 510 further has an optical splitter 520 and an optical coupler 526. Optical splitter 520 is configured to split an optical output signal 518 generated by E/O converter 516 into J (attenuated) signal copies $522_1$-$522_J$, where J is the number of cores in multi-core fiber 540. Optical coupler 526 is configured to couple each of signals $522_1$-$522_J$ into a corresponding core of multi-core fiber 540.

E/O converter 516 is configured to generate optical output signal 518 based on a set 514 of four digital signals supplied by a DSP 512. The four signals of set 514 may be analogous to digital signals $114_1$-$114_4$, respectively (see FIG. 1). Signal set 514 is generated by DSP 512 based on an input data stream 502.

In one configuration, the processing implemented in DSP 512 is generally analogous to method 200 (FIG. 2). Note, however, that optical splitter 520 and optical coupler 526 operate to increase the number of optical variants per bit-word by a factor of J. Thus, if signal 518 has $n_1$ optical variants per bit-word, then an output signal 530 generated in this configuration by transmitter 510 contains $n_2$ (=J×$n_1$) optical variants per bit-word.

In an alternative configuration, method 200 is not invoked, and DSP 512 configures E/O converter 516 to operate in a conventional manner, e.g., by generating a single "optical variant" per bit-word. However, after optical splitter 520 and optical coupler 526 process said single "optical variant," output signal 530 generated by transmitter 510 in this alternative configuration still contains more than one optical variant (e.g., J optical variants) per bit-word.

After propagating through multi-core fiber 540, signal 530 is applied (as signal 530') to receiver 590 for processing. Receiver 590 has an optical coupler 546 and a front-end circuit 572 comprising J front-end circuits $172_1$-$172_J$ (also see FIG. 1). Optical coupler 546 is configured to direct light from each core of multi-core fiber 540 to a corresponding one of front-end circuits $172_1$-$172_J$. Each of front-end circuits $172_1$-$172_J$ then processes the signal received from optical coupler 546, as described above in reference to FIG. 1, to generate a corresponding one of sets $568_1$-$568_J$, each having four digital signals analogous to digital signals $168_1$-$168_4$, respectively (see FIG. 1). In one embodiment, front-end circuits $172_1$-$172_J$ in receiver 590 share a single common OLO 156 (see FIG. 1).

Signal sets $568_1$-$568_J$ generated by front-end circuit 572 are processed by a DSP 570 to recover the data of original input stream 502 applied to transmitter 510. In one embodiment, the processing implemented in DSP 570 is generally analogous to method 300 (FIG. 3). However, one modification to method 300 to adapt it to receiver 590 is that (i) a separate instance of step 302 is performed for each digital-signal set 568 and (ii) at step 304, the corrected signal samples for each set Z are collected from the results of two or more of these separate instances of step 302.

Figure 6:
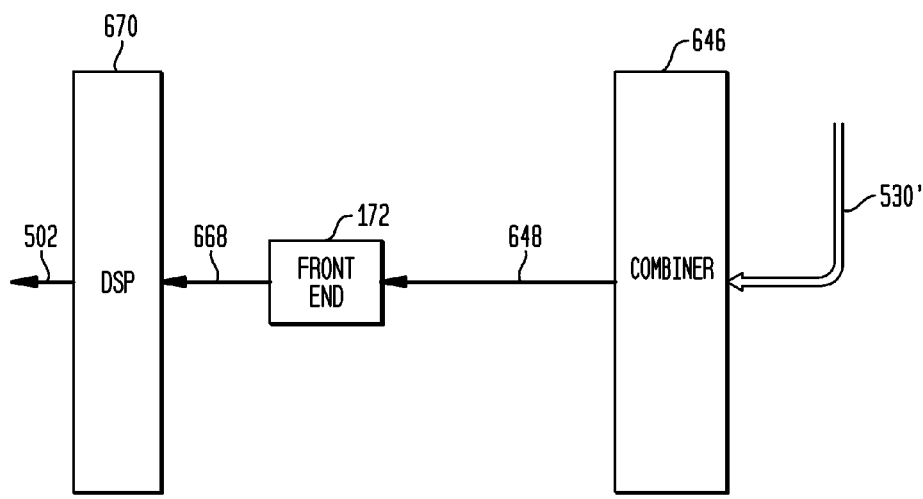
FIG. 6 shows a block diagram of an optical receiver that can be used in the optical transport system of FIG. 5 according to one embodiment of the invention.

FIG. 6 shows a block diagram of an optical receiver 600 that can be used as optical receiver 590 (FIG. 5) according to one embodiment of the invention. Receiver 600 is shown as receiving optical signal 530' (also see FIG. 5). As already indicated above, signal 530' carries optical variants corresponding to different cores of multi-core fiber 540. These optical variants are applied to an optical combiner 646 configured to combine them in the optical domain into a combined optical signal 648. Combined optical signal 648 is then applied to front-end circuit 172 for detection. In this feature, receiver 600 differs from receiver 590 (FIG. 5), wherein each optical variant is detected separately using a corresponding one of front-end circuits $172_1$-$172_J$. Front-end circuit 172 of receiver 600 converts combined optical signal 648 into a corresponding set 668 of four digital signals, as already indicated above. Signal set 668 is then processed by a DSP 670 to recover the data of original input stream 502, based on which optical signal 530 was generated in transmitter 510 (FIG. 5).

In one embodiment, the processing implemented in DSP 670 is generally analogous to method 300 (FIG. 3). However, one modification to method 300 to adapt it to receiver 600 is that step 302 now includes signal-equalization processing. More specifically, if X(f) is the spectrum of optical signal 518 generated by transmitter 510 (see FIG. 5), then the spectrum Y(f) of optical signal 648 can be approximated by Eq. (6):

$$Y(f)=X(f)\times[H_1(f)+H_2(f)+\ldots+H_J(f)]=X(f)\times H(f) \quad (6)$$

where $H_j(f)$ is the individual transmitter-to-receiver transfer function corresponding to the j-th core of multi-core fiber 540, where j=1, 2, ..., J. Typically, the overall transmitter-to-receiver transfer function H(f) will vary randomly over time. The signal-equalization processing implemented in DSP 670 serves to adaptively determine and track H(f), without having to determine and track the individual transfer functions $H_j(f)$. DSP 670 can then calculate the inverse transfer function $H^{-1}(f)$ and apply it to the digital-signal samples at step 302 of method 300 to perform channel compensation. The result of this processing is substantially the same as that obtained by DSP 570 in receiver 590 by performing a separate instance of step 302 on digital-signal samples provided by each of signal sets 568₁-568_J. Note, however, that because H(f) may have relatively deep frequency fades, the use of OFDM in the corresponding optical transport system may be particularly beneficial for this type of detection of optical variants. In one embodiment, the circuitry that implements Eq. (6) is based on a finite impulse response (FIR) filter.

While this invention has been described with reference to illustrative embodiments, this description is not intended to be construed in a limiting sense.

Although system 500 (FIG. 5) has been described in reference to multi-core fiber 540, it can be adapted for use with a multimode fiber, wherein different guided modes of the multimode fiber provide the spatial degrees of freedom for the generation and transmission of optical variants. Representative optical couplers that can be used in conjunction with the multimode fiber in such a system are disclosed, e.g., in U.S. Patent Application Publication Nos. 2010/0329670 and 2010/0329671 and U.S. patent application Ser. No. 12/986,468, filed on Jan. 7, 2011, and Ser. No. 12/827,284, filed on Jun. 30, 2010, all of which are incorporated herein by reference in their entirety.

In one embodiment, different cores of multi-core fiber 540 can be configured to concurrently transmit optical variants corresponding to different bit-words. It may beneficial, however, to configure multi-core fiber 540 so that, at any time, at least two of its cores transmit optical variants corresponding to the same bit-word.

Furthermore, system 500 can be modified in a relatively straightforward manner to use optical variants that differ from each other in one or more of time, polarization, carrier wavelength, and space. In one embodiment, such a modification can be accomplished, e.g., by (i) replacing E/O converter 516 by front-end circuit 416, (ii) replacing each of front-end circuits 172₁-172_J by a corresponding instance of front-end circuit 472, and (iii) appropriately reconfiguring DSPs 512 and 570 (see FIGS. 4 and 5).

In various alternative embodiments of methods 200 and 300, the order of certain processing steps may be changed to differ from the order indicated in FIGS. 2 and 3, respectively.

In one embodiment, step 202 of method 200 and step 314 of method 300 are optional and can be omitted.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flowcharts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical receiver that comprises:
    a front-end circuit configured to convert an optical input signal into a corresponding plurality of digital electrical signals; and
    a processor configured to:
        process the plurality of digital electrical signals to generate a first set of complex values, each corresponding to a first bit-word, said first set of complex values including at least three complex values;
        sum the at least three complex values of the first set to generate a summed complex value; and
        map the summed complex value onto a constellation to determine the first bit-word; and
    wherein, in response to the optical input signal having at least a first optical variant, a second optical variant, and one or more additional optical variants, with each of said first, second, and one or more additional optical variants carrying the first bit-word, the processor is configured to include into the at least three complex values:
        at least one complex value that corresponds to the first optical variant;
        at least one complex value that corresponds to the second optical variant; and
        at least one complex value that corresponds to an additional optical variant.

2. The apparatus of claim 1, wherein the first optical variant and the second optical variant differ from one another in one or more of time of arrival at the optical receiver, spatial localization, polarization of light, carrier wavelength, and subcarrier frequency.

3. The apparatus of claim 1, wherein:
    the first optical variant and the second optical variant carry different constellation symbols, each encoding the first bit-word; and
    the processor is configured to generate the first set of complex values by applying different respective transforms to the at least one complex value that corresponds to the first optical variant and to the at least one complex value that corresponds to the second optical variant.

4. The apparatus of claim 3, wherein each of the respective transforms is a respective phase rotation.

5. The apparatus of claim 1, wherein the first optical variant and the second optical variant differ from one another in polarization of light.

6. The apparatus of claim 5, wherein:
    the front-end circuit comprises a polarization-diverse optical hybrid configured to generate a first set of electrical signals corresponding to the first optical variant and a second set of electrical signals corresponding to the second optical variant; and
    the plurality of digital electrical signals includes at least one digital signal corresponding to said first set of electrical signals and at least one digital signal corresponding to said second set of electrical signals.

7. The apparatus of claim 1, wherein the first optical variant and the second optical variant differ from one another in carrier wavelength.

8. The apparatus of claim 7, wherein:
    the front-end circuit comprises a wavelength de-multiplexer configured to de-multiplex the optical input signal into:
        a first optical signal having a first carrier wavelength, said first carrier wavelength being a carrier wavelength of the first optical variant; and
        a second optical signal having a second carrier wavelength, said second carrier wavelength being a carrier wavelength of the second optical variant; and
    the plurality of digital electrical signals includes at least one digital signal corresponding to the first optical signal and at least one digital signal corresponding to the second optical signal.

9. The apparatus of claim 1, wherein the first optical variant and the second optical variant differ from one another in spatial localization.

10. The apparatus of claim 9, wherein:
    the front-end circuit comprises an optical coupler configured to receive the optical input signal from a multi-core fiber and generate:
        a first optical signal corresponding a first core of the multi-core fiber, said first core being a core carrying the first optical variant; and
        a second optical signal corresponding a second core of the multi-core fiber, said second core being a core carrying the second optical variant; and
    the plurality of digital electrical signals includes at least one digital signal corresponding to the first optical signal and at least one digital signal corresponding to the second optical signal.

11. The apparatus of claim 9, wherein:
the front-end circuit comprises an optical coupler configured to receive the optical input signal from a multimode fiber and generate:
  a first optical signal corresponding a first guided mode of the multimode fiber, said first guided mode being a mode carrying the first optical variant; and
  a second optical signal corresponding a second guided mode of the multimode fiber, said second guided mode being a mode carrying the second optical variant; and
the plurality of digital electrical signals includes at least one digital signal corresponding to the first optical signal and at least one digital signal corresponding to the second optical signal.

12. The apparatus of claim 1, wherein the processor is further configured to:
sort digital-signal samples corresponding to the digital electrical signals to generate a plurality of sets Z, each set Z having a respective plurality of complex values corresponding to a respective one bit-word; and
condition each set Z to generate a corresponding set of complex values adapted for coherent summation, wherein the first set of complex values is one of said corresponding sets of complex values adapted for coherent summation;
for each set of complex values adapted for coherent summation, sum the complex values of the set to generate a respective summed complex value;
map each of the respective summed complex values onto the constellation to determine the respective one bit-word; and
arrange said respective bit-words in a specified order to generate a data stream.

13. The apparatus of claim 12, wherein the processor is further configured to perform FEC-based error correction on said data stream.

14. The apparatus of claim 12, wherein, to condition each set Z, the processor is configured to apply a respective inverse topological transform to each of the complex values of the set Z or a phase-unscrambling operation to each of the complex values of the set Z.

15. The apparatus of claim 12, wherein, to condition each set Z, the processor is configured to perform a phase-estimation and phase-compensation operation.

16. The apparatus of claim 15, wherein the processor is configured to perform the phase-estimation and phase-compensation operation based on a pilot signal.

17. The apparatus of claim 12, wherein, to condition each set Z, the processor is configured to:
determine respective phase differences between different elements of set Z; and
apply differential de-coding to determine bit-words encoded by said phase differences.

18. The apparatus of claim 1, wherein the processor is configured to generate the first set of complex values by (i) generating a set Z of complex values, each corresponding to the first bit-word, and (ii) conditioning the set Z to generate the first set of complex values.

19. The apparatus of claim 18,
wherein the first optical variant and the second optical variant carry different constellation symbols, each generated from the first bit-word using a respective topological transform; and
wherein, to condition the set Z, the processor is configured to apply a respective inverse topological transform to each of the complex values of the set Z.

20. The apparatus of claim 18,
wherein the first optical variant and the second optical variant carry different constellation symbols, each generated from the first bit-word using a respective phase-scrambling operation; and
wherein, to condition the set Z, the processor is configured to apply a respective phase-unscrambling operation to each of the complex values of the set Z.

* * * * *